United States Patent [19]
Shrinkle

[11] Patent Number: 5,585,974
[45] Date of Patent: Dec. 17, 1996

[54] DISK DRIVE WITH PRML READ CHANNEL CALIBRATION USING A NOISE GENERATOR

[75] Inventor: Louis J. Shrinkle, Leucadia, Calif.

[73] Assignee: Conner Peripherals, Inc., San Jose, Calif.

[21] Appl. No.: 390,003

[22] Filed: Feb. 17, 1995

[51] Int. Cl.$^6$ .................................................. G11B 5/09
[52] U.S. Cl. ............................................ 360/46; 360/65
[58] Field of Search ................................. 360/65, 46, 53; 371/28

[56] References Cited

U.S. PATENT DOCUMENTS

| | | | |
|---|---|---|---|
| 3,600,703 | 8/1971 | Geissler | 331/78 |
| 4,139,895 | 2/1979 | Kurkjian et al. | 364/802 |
| 4,160,875 | 7/1979 | Kahn | 179/1.5 M |
| 4,408,324 | 10/1983 | Black et al. | 370/81 |
| 5,408,367 | 4/1995 | Emo | 360/53 |
| 5,422,760 | 6/1995 | Abbott et al. | 360/51 X |

*Primary Examiner*—W. Chris Kim
*Attorney, Agent, or Firm*—Kinney & Lange, P.A.

[57] ABSTRACT

A read channel is described for use in a storage device including a storage medium for storing data, an interactive element for reading information from and writing information on the storage medium and a processor for performing control functions in the storage device. The read channel comprises a set of electronic components for receiving and processing information read by the interactive element from the storage medium. An adjustable noise generator is included in the read channel and is coupled to the set of electronic components. The noise generator is selectively operated to introduce noise into the set of electronic components to cause the set of electronic components to operate at a marginal level of performance and thereby increase the error rate of the read channel. A calibration of the read channel is performed when the read channel is operating at the marginal level of performance to decrease the time required to accumulate error statistics used in the calibration.

23 Claims, 4 Drawing Sheets

DISK DRIVE WITH PRML READ CHANNEL CALIBRATION USING A NOISE GENERATOR

FIELD OF THE INVENTION

The present invention is directed to disk drives. More particularly, the present invention provides a method and system for efficiently achieving calibration of a complex digital read/write channel used in the disk drive.

BACKGROUND OF THE INVENTION

Disk drives are commonly used in workstations, personal computers, laptops and other computer systems to store large amounts of data that are readily available to a user. In general, a disk drive comprises a magnetic disk that is rotated by a spindle motor. The surface of the disk is divided into a series of data tracks that extend circumferentially around the disk. Each data track can store data in the form of magnetic transitions on the disk surface. For example, each transition can represent a bit of information.

A head includes an interactive element, such as a magnetic transducer, that is used to sense the magnetic transitions to read data, or to conduct an electric current that causes a magnetic transition on the disk surface, to write data. The magnetic transducer includes a read/write gap(s) that positions the active elements of the transducer at a position suitable for interaction with the magnetic transitions on the surface of the disk, as the disk rotates.

It is expected that users of disk drives will place ever greater demands on disk drive manufacturers with regard to the amount of data that can be stored in and rapidly retrieved from disk drive products. Modern software programs include graphics and other data structures that dramatically increase the amount of data that need to be stored. In addition, the rapid growth in the use of servers on computer networks requires large storage capabilities to accommodate the data needs of a large number of users on the network who utilize the servers.

Accordingly, recent disk drive research and development efforts have focused on the need to continually improve, among other things, the magnetic media used in the disks so as to substantially increase the storage capacity of each new disk drive design to levels sufficient to accommodate the ever greater demands for storage capacity placed on disk drive products by users. Moreover, the trend in recent years has been to design and build disk drive products that are lightweight and compact in size, and that operate at high rotational velocities of the disks to increase data read and write rates.

A consequence of the increasing capacity of disk drive products having compact designs is that the data density on the surface of the disks and the rotational speeds of the disks are approaching levels that are too high relative to the capability of conventional magnetic transducers to rapidly and accurately sense closely spaced, fast moving magnetic transitions in a data read operation. Moreover, conventional electronic circuits typically used to receive and process electrical signals representative of the transitions sensed by the magnetic transducers are also unable to operate at data read rates commensurate with the high data densities and rotational speeds of modern disk drive designs.

One proposal to meet the data retrieval requirements of modern disk drive designs is to utilize a magnetoresistive transducer (MR transducer) coupled to an electronic read channel that implements signal processing techniques such as partial response, maximum likelihood detection (PRML read channel). These components provide significantly improved performance capabilities and are able to process signals representative of data at rates suitable for operation with modern high capacity, high performance disk drives.

In an MR transducer, a magnetoresistive element is used to sense the magnetic transitions representing data. The magnetoresistive element comprises a material that exhibits a change in electrical resistance as a function of a change in magnetic flux of a magnetic field applied to the element. In a disk drive environment, the MR element is positioned within a transducer gap, above a disk surface. In this position, the electrical resistance of the element changes in time as magnetic transitions recorded on the disk pass beneath the gap, due to rotation of the disk. The changes in the resistance of the MR element caused by magnetic transitions on a disk occur far more quickly than the response of conventional transducers to magnetic transitions. Thus, an MR transducer is able to sense magnetic transitions at higher rotational speeds and data densities.

The MR transducer is coupled to an electronic circuit, a pre-amplifier, that operates to detect the resistance changes of the MR element, and generate electrical signals that vary in time as a function of the resistance changes. The pre-amplifier output, therefore, comprises an electrical signal that corresponds to the data recorded as magnetic transitions on the disk surface. The output of the preamplifier is coupled to a read channel that thereafter processes the pre-amplifier output signal according to PRML techniques to interpret the data represented by the output signal.

The PRML channel may comprise a read channel implementing any number of partial response techniques including, e.g., PR4ML, EPR4ML and EEPR4ML. PRML techniques can operate with more efficient data recording codes, and are able to process signals at more rapid rates than conventional peak detectors now widely used in disk drives to detect data from signals received from a transducer.

In any signal processing electronic circuit, such as a PRML read channel, the electrical signal output by the circuit varies as a function of the electrical signal input to the circuit. For example, in a simple amplifier, the signal output by the amplifier should have the same wave shape and frequency as the signal input to the amplifier, but with a higher amplitude. In other words, the amplifier amplifies the magnitude of the input signal.

The change between the input and output signals is referred to as the transfer function of the circuit. In the case of an ideal, simple amplifier, the transfer function can be expressed as output=k*(input), where k is a coefficient representing the magnitude of amplification. If the amplifier amplifies an input signal by a factor of 10, then k, in that instance, equals 10, and a one volt input signal will result in a 10 volt output-signal.

Actual electronic circuits do not, however, operate in the ideal fashion that they were designed. An amplifier will introduce some "noise" into the output signal such that the output does not necessarily have the exact same wave shape and/or frequency phase as the input signal. Generally, "noise" is any unwanted electrical changes introduced into a circuit's output that may result form, e.g., certain operating characteristics inherent in the circuit design, the operating environment of the circuit, and so on.

Electronic circuits that implement or support PRML signal processing techniques, particularly digital PRML channels, are complex and include numerous operating parameters and characteristics that affect circuit output, and thus the accuracy of data interpretation. Integrated circuits that implement PRML channels include variable parameters that can be adjusted to calibrate the PRML circuit for optimized operation. In other words, the transfer function of the PRML channel can be modified to minimize errors in data processing. The accuracy of calibration of the PRML channel is of utmost importance in achieving optimized performance for the disk drive.

Typically, each particular PRML channel is calibrated for optimized operation when coupled to the specific interactive element/disk interface of the disk drive where the channel is installed. Each interactive element/disk interface is unique, and the calibration of an associated PRML channel should correspond to the actual operating environment where it is to operate. Thus, in a multiple disk drive, the number of calibrations that must be performed can be considerable resulting in time consuming calibration procedures.

A conventional approach to calibration of a read channel is to write a test signal on the disk, using, e.g., a pseudo-random signal generation algorithm. A bit pattern corresponding to the random signal generated at any one time will be known upon generation, and the disk drive is operated to write the known generated signal onto the disk of the drive. The random test signal serves as a proxy for data that would ordinarily be written as magnetic transitions on the disk. The disk drive is then operated to cause the interactive element, e.g., the MR element, to read back the written test signal, using the PRML channel to interpret the magnetic transitions representing the test signal. The PRML channel outputs a bit pattern representing the written signal.

A bit by bit comparison can then be made between the known bit pattern of the test signal and the bit pattern output by the PRML channel, to determine an error rate, that is the number of bits in the PRML output that do not match the corresponding bit values of the known test signal. Of course, an ideal PRML channel would output a bit pattern that exactly matches the bit pattern of the test signal. Calibration of the PRML channel involves adjusting and modifying the operating parameters of the PRML channel to obtain a minimum error rate. A problem with the bit by bit comparison to measure an error rate is that a well designed PRML channel has a very low signal to noise ratio, and, therefore, a very low error rate, even within the range of parameter values that would be modified by a calibration of the channel.

For example, a PRML channel can have an error rate in the range of $10^{-9}$. A $10^{-9}$ error rate indicates that one billion bits must ordinarily be read from a test pattern before an error is encountered in one bit. Thus, the calibration process would involve a read back of bits numbered in the billions to accurately measure an error rate. This high bit read back amount results in very time consuming calibration procedures since a large number of bits must be read and decoded by the PRML channel in order to acquire enough bit error statistics to support an effective and accurate calibration of the channel.

Another approach is to install adaptive circuits in the read channel to provide measured values relating to channel performance. The values can be used to adjust or adapt PRML circuit parameters. A problem with this solution is that the values measured by the adaptive circuits are only loosely correlated to a channel error rate, and thus provide less than a fine tuned calibration for the channel. In addition, such adaptive circuits are generally too costly in terms of circuit complexity.

SUMMARY OF THE INVENTION

The present invention provides a system and method to accurately and efficiently calibrate a read/write circuit to thereby optimize operating parameters of complex circuits such as PRML channels used in the circuit. According to the present invention, the operation of, e.g., the read channel is marginalized by the introduction of noise into the read channel during the time of calibration. Accordingly, the performance of the read channel is purposely degraded during calibration, in a manner consistent with channel characteristics, to a marginal level of performance to dramatically increase the bit error rate.

For example, the noise level within the channel can be increased to a magnitude at which the error rate is $10^{-4}$. A $10^4$ error rate indicates that ten thousand bits must ordinarily be read from a test pattern before an error is encountered in one bit. Compared to an error rate of $10^{-9}$, the degraded channel error rate decreases by several orders of magnitude the amount of bits that must be read back in order to develop the error statistics needed for effective channel calibration. Thus, rather than billions of bits, the present invention can acquire error statistics by merely reading back tens of thousands of bits.

In this regard, the present invention is based upon a recognition that a calibration of the channel to minimize the error rate can be effective for any level of noise, particularly if the noise is Gaussian noise. With Gaussian noise, the mean value of the added noise is zero and PRML channels are designed to encounter some Gaussian noise in the circuit. When a circuit is efficiently calibrated to minimize the error rate during the degraded marginal operation of the channel, the error rate of the channel upon removal of the noise added to the channel according to the present invention, will also be at a minimum. The calibration technique of the present invention reduces the time requirements for calibration by such a significant amount that more and higher quality adjustments can be made to the channel in significantly less time than would be possible with the conventional approach.

In an exemplary embodiment of the present invention, a noise generator is implemented in the integrated circuit comprising the read/write circuit. The noise generator is coupled to, e.g., the read channel to controllably introduce noise into the channel during the time a calibration of the channel is to be performed. The operation of the noise generator can be controlled by a processor installed in the disk drive. For example, the noise level selected for introduction into the channel can be set as a function of a value written by the processor into a register provided in the integrated circuit's register set. The value can be determined to provide sufficient degradation of channel performance to reach a marginal level.

DETAILED DESCRIPTION

Figure 1:
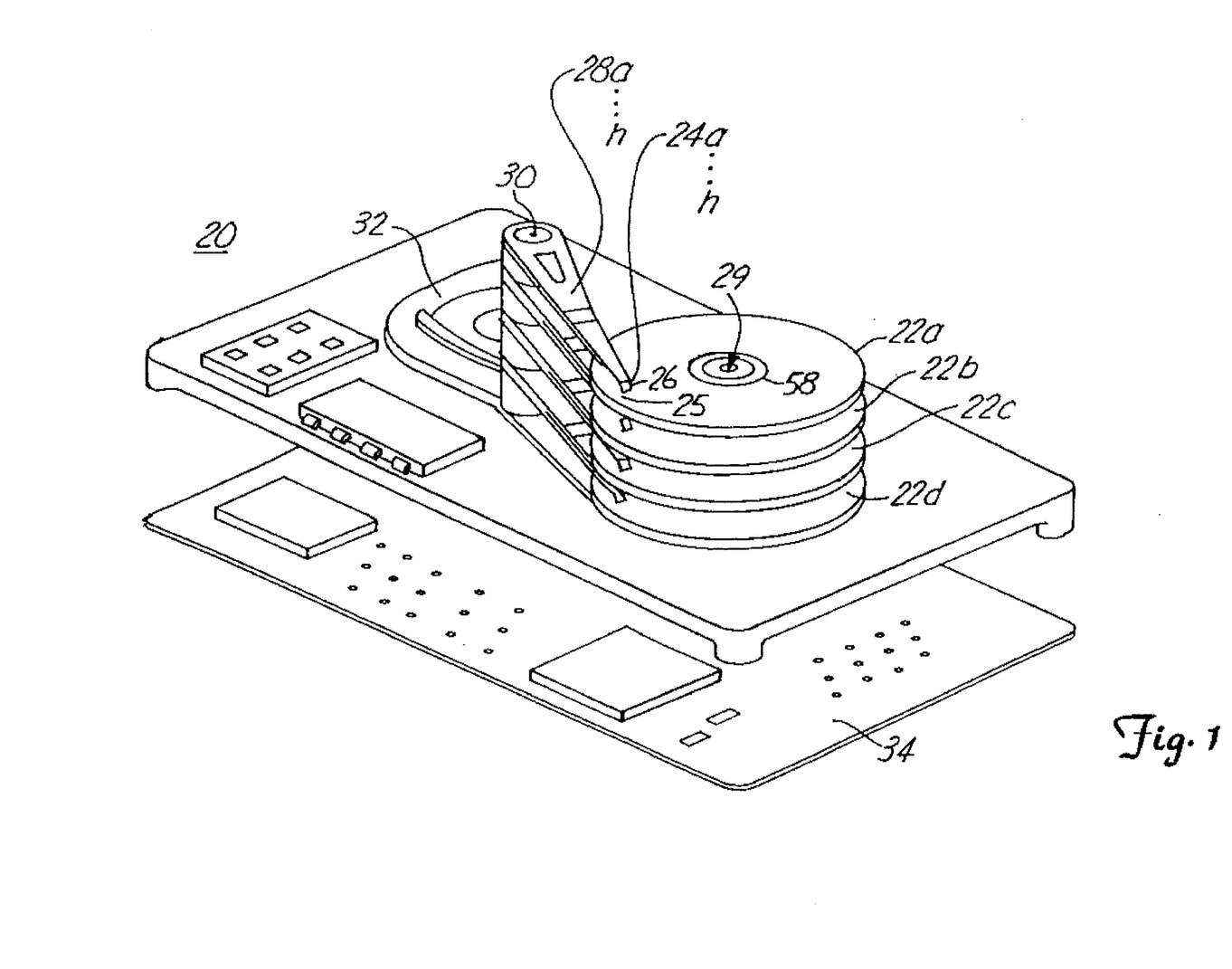
FIG. 1 is perspective view of an exemplary disk drive.

Referring now to the drawings, and initially to FIG. 1, there is illustrated an example of a disk drive designated generally by the reference numeral 20. The disk drive 20 includes a plurality of storage disks 22a–d and a plurality of read/write heads 24a–h. Each of the storage disks 22a–d is provided with a plurality of data tracks to store user data. As illustrated in FIG. 1, one head is provided for each surface of each of the disks 22a–d such that data can be read from or written to the data tracks of all of the storage disks. It should be understood that the disk drive 10 is merely representative of a disk drive system utilizing the present invention and that the present invention can be implemented in a disk drive system including more or less storage disks. The storage disks 22a–d are mounted for rotation by a spindle motor arrangement 29, as is known in the art. Moreover, the read/write heads 24a–h are supported by respective actuator arms 28a–h for controlled positioning over preselected radii of the storage disks 22a–d to enable the reading and writing of data from and to the data tracks. To that end, the actuator arms 28a–h are rotatably mounted on a pin 30 by a voice coil motor 32 operable to controllably rotate the actuator arms 28a–h radially across the disk surfaces.

Each of the read/write heads is mounted to a respective actuator arm 28a–h by a flexure element (not shown) and comprises a magnetic transducer structure 25 mounted to a slider 26 having an air bearing surface (not shown), all in a known manner. For high performance operation, the magnetic transducer structure 25 can comprise a pair of transducers, including a magnetoresistive element (MR element) as a read transducer and an inductance coil as a write transducer. As typically utilized in disk drive systems, the sliders 26 cause the magnetic transducer structures 25 of the read/write heads 24a–h to "fly" above the surfaces of the respective storage disks 22a–d for non-contact operation of the disk drive system. When not in use, the voice coil motor 32 rotates the actuator arms 28a–h during a contact stop operation, to position the read/write heads 24a–h over a respective landing zone 58 or 60, where the read/write heads 24a–h come to rest on the storage disk surfaces. As should be understood, each of the read/write heads 24a–h is at rest on a respective landing zone 58 or 60 at the commencement of a contact start operation.

A printed circuit board (PCB) 34 is provided to mount control electronics for controlled operation of the spindle motor 29 and the voice coil motor 32. The PCB 34 also includes read/write channel circuitry coupled to the read/write heads 24a–h, to control the transfer of data to and from the data tracks of the storage disks 22a–d. The manner for coupling the PCB 34 to the various components of the disk drive is well known in the art.

Figure 2:
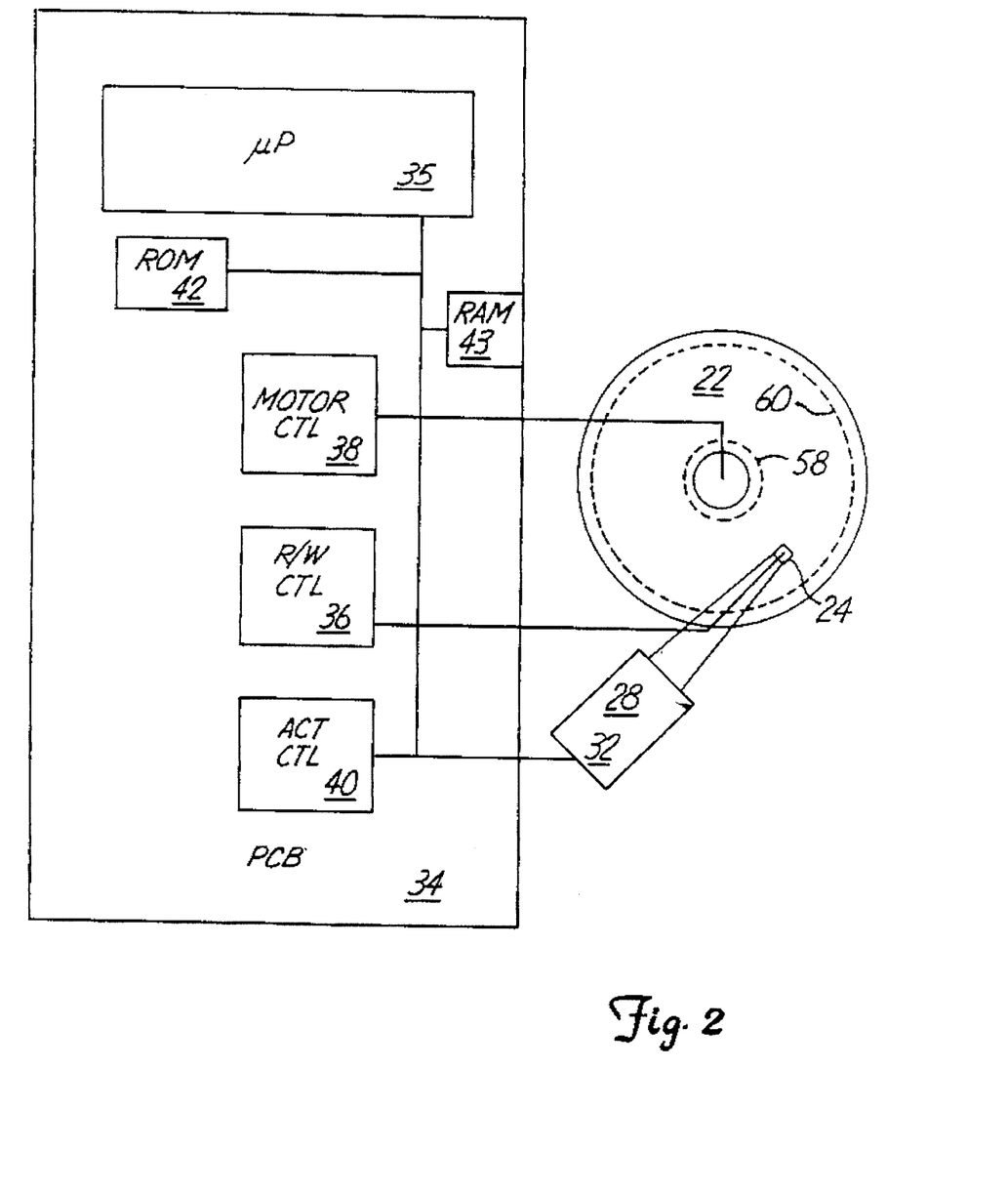
FIG. 2 is a top plan view of the printed circuit board of the disk drive of FIG. 1.

Referring now to FIG. 2, there is illustrated in schematic form the PCB 34 and the electrical couplings between the control electronics on the PCB 34 and the components of the disk drive system described above. A microprocessor 35 is coupled to each of a read/write control 36, spindle motor control 38, actuator control 40, ROM 42 and RAM 43. In modern disk drive designs, the microprocessor can comprise a digital signal processor (DSP). The microprocessor 35 sends data to and receives data from the storage disks 22a–d via the read/write control 36 and the read/write heads 24a–h.

The microprocessor 35 also operates according to instructions stored in the ROM 42 to generate and transmit control signals to each of the spindle motor control 38 and the actuator control 40.

The spindle motor control 38 is responsive to the control signals received from the microprocessor 35 to generate and transmit a drive voltage to the spindle motor 29 to cause the storage disks 22a–d to rotate at an appropriate rotational velocity.

Similarly, the actuator control 40 is responsive to the control signals received from the microprocessor 35 to generate and transmit a voltage to the voice coil motor 32 to controllably rotate the read/write heads 24a–h, via the actuator arms 28a–h, to preselected radial positions over the storage disks 22a–d. The magnitude and polarity of the voltage generated by the actuator control 40, as a function of the microprocessor control signals, determines the radial direction and speed of the read/write heads 24a–h.

When data to be written or read from one of the storage disks 22a–d are stored on a data track different from the current radial position of the read/write heads 24a–h, the microprocessor 35 determines the current radial position of the read/write heads 24a–h and the radial position of the data track where the read/write heads 24a–h are to be relocated. The microprocessor 35 then implements a seek operation wherein the control signals generated by the microprocessor 35 for the actuator control 40 cause the voice coil motor 32 to move the read/write heads 24a–h from the current data track to a destination data track at the desired radial position.

When the actuator has moved the read/write heads 24a–h to the destination data track, a multiplexer (not shown) is used to couple the head 24a–h over the specific data track to be written or read, to the read/write control 36, as is generally known in the art. The read/write control 36 includes a read channel that, in accordance with modern disk drive design, comprises a partial response, maximum likelihood read channel, for high performance processing of electrical signals transduced by the MR element during a read operation. The RAM 43 can be used to buffer data read from or to be written to the storage disks 22a–d.

Figure 3:
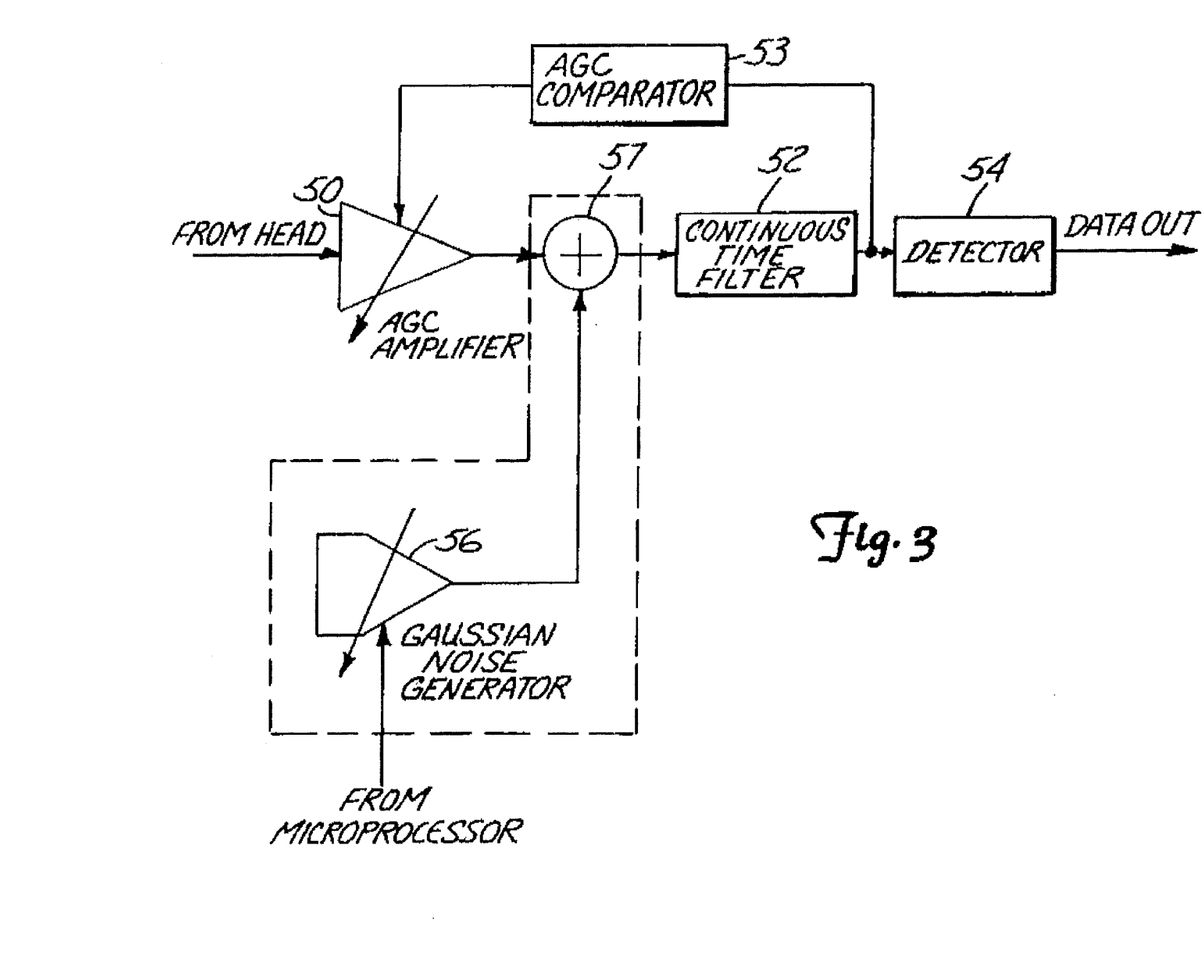
FIG. 3 is a block diagram of a representative PRML channel used in the disk drive of FIG. 1, and including an adjustable noise generator coupled to an automatic gain control of the PRML channel, according to the present invention.

FIG. 3 illustrates, in block diagram form, a representative PRML channel included in the read/write control 36. In accordance with known disk drive design, the raw electrical signals transduced by the MR element from the magnetic transitions on the disk surface, are processed by a preamplifier (not shown) whose output is coupled to an input of an automatic gain control amplifier (AGC) 50. The AGC 50 is used to maintain the gain for the signals transmitted into the PRML read channel at a desired level, while the input to the AGC varies in amplitude.

An output of the AGC 50 is coupled to a continuous time filter 52. The continuous time filter 52 provides filtering and partial amplitude and phase equalization for the signals transmitted in the PRML read channel. An output of the continuous time filter 52 is coupled a PRML read channel 54 which acts as a detector to derive digital bit signals representing data stored on the disk, from the filtered electrical signals transmitted by the continuous time filter 52. The output of the continuous time filter 52 is also coupled to an AGC comparator 53 for feedback of gain information to the AGC 50. The AGC 50 processes the feedback information to control the gain function of the AGC 50 in accordance with known techniques.

An output of the read channel 54 can be coupled to other circuitry in the read/write control, as generally known for temporary storage of the read data in the RAM 43. The microprocessor 35 can control the transfer of the read data from the RAM 43 to a host computer (not shown) that is using the disk drive for data storage.

As known, the PRML channel implements PRML signal processing techniques to detect digital information from the electrical signals and typically includes components that are adjustable to vary the operating parameters of the read channel to optimize data detection for highly accurate data detection. Typically, the adjustments are made in a calibration operation wherein known test patterns comprising random bit sequences are written onto the disk surfaces, as described above.

The disk drive is then operated to read back the test patterns, which pass through the PRML read channel 54. The bits output by the PRML channel 54 are compared, bit by bit, to the test patterns to provide bit detection error rates within the PRML read channel 54 with respect to each of the heads 24a–h of the disk drive. A comparator to perform the bit by bit comparison can be installed in the disk drive. Alternatively, an external comparator can be used. A user can then vary the parameters of the channel 54 after each read back and comparison of a test pattern, until the error rate for the pattern reaches a minimum value, usually set in the design specification for the disk drive product.

Pursuant to the present invention, the read channel is marginalized during the calibration operation to purposely increase the error rate so that error statistics sufficient to support a reliable calibration process can be accumulated quickly. To that end, an adjustable Gaussian noise generator 56 is provided in the read/write control 36. As noted above, Gaussian noise is used because the mean value of the added noise is zero and PRML channels are designed to encounter some Gaussian noise in the circuit. An output of the noise generator 56 is coupled to a summing circuit 57 that operates to introduce the noise output of the generator 56 into the signals output by the AGC 50. Alternatively, the summing circuit 57 can be arranged at the input side of the AGC 50 to introduce the noise to signals prior to amplification by the AGC 50.

With the addition of the noise into the AGC signals, operation of the PRML channel 54 will degrade to a marginal condition, with a commensurate increase in the error rate. Accordingly, error statistics for use in the calibration operation can be accumulated at an accelerated rate. The amount of increase of the error rate is a function of the amount of noise introduced into the circuit. To that end, a control input to the noise generator is coupled to the microprocessor 35. The microprocessor 35 can be programmed to control the operation of the noise generator 56 and adjust the amount of noise introduced into the PRML channel.

For example, the microprocessor 35 can introduce a first level of noise, and thereafter interrogate the read back signal to measure the error rate. If the error rate is above a preselected error rate, indicating that the channel has degraded below a marginal level of performance, the microprocessor 35 can lower the level of noise to a second level, and again interrogate the read back signal. The microprocessor 35 can thereby fine tune the amount of noise introduced into the channel for controlled performance degradation of the channel to marginal levels.

Figure 4:
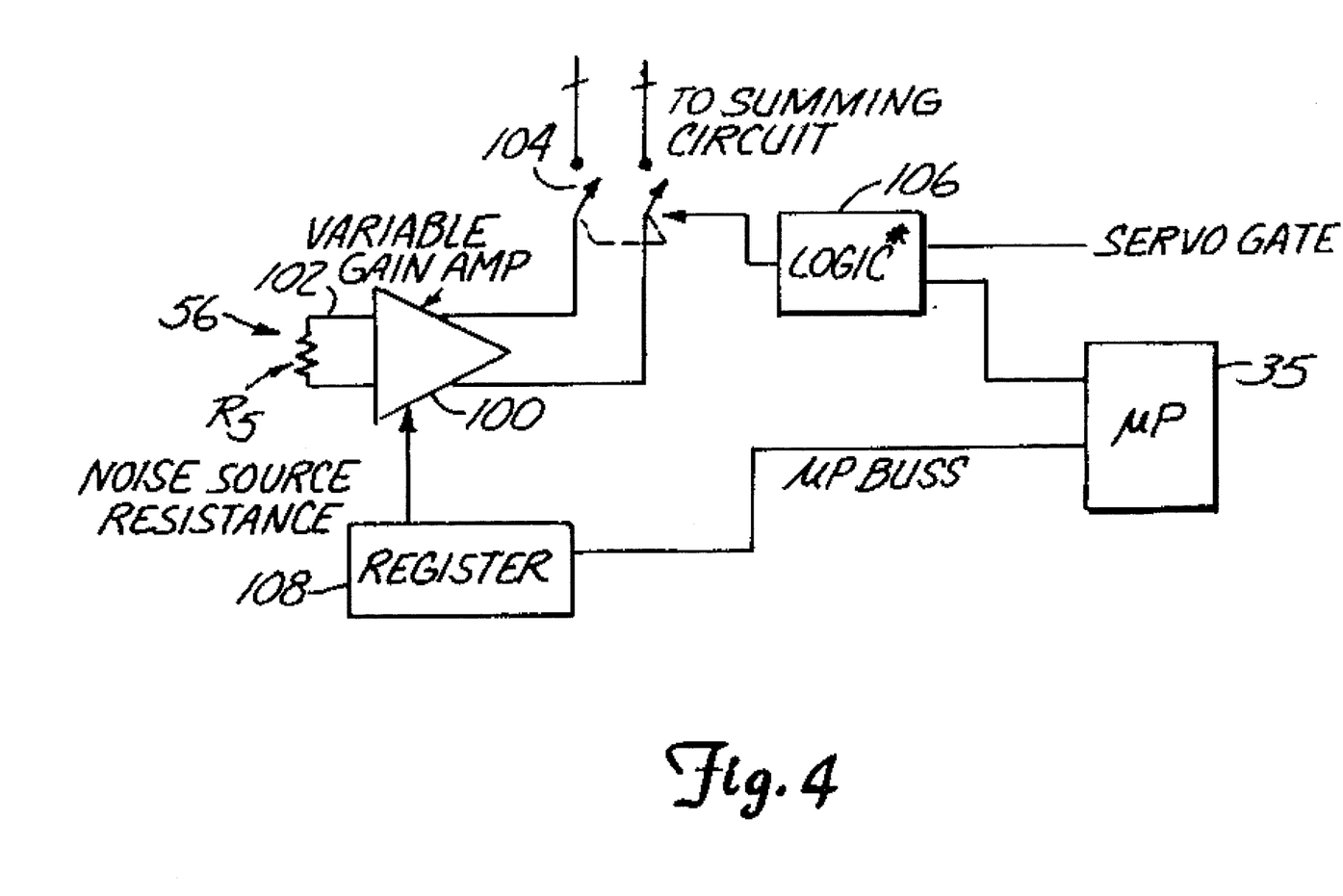
FIG. 4 is a schematic diagram of the adjustable noise generator shown in each of FIG. 3.

Referring now to FIG. 4, there is illustrated a schematic diagram of the adjustable noise generator of FIG. 3. The noise generator 56 comprises a variable gain amplifier 100 including a resistor 102 coupled across an input to the amplifier 100. The resistor 102 acts as a source of noise for amplification by the amplifier 100. A differential output of the amplifier is coupled to a switch 104 that can be operated to selectively connect the noise output by the amplifier 100 to the summing circuit 57.

A logic circuit 106 provides on/off control for the switch 104. To that end, the logic circuit 106 is coupled to the microprocessor 35 which can control the introduction of noise into the read channel by applying an appropriate logic value to the logic circuit 106 which is responsive to open or close the switch 104, as indicated by the microprocessor signal. The logic circuit 106 also receives a SERVO GATE signal. The logic circuit 106 is responsive to open the switch 104 when the SERVO GATE signal is in a predetermined state.

Modern disk drives include servo systems to control the position of the actuator arms 28a–h over data tracks of a disk surface to insure that the heads 24a–h accurately transduce magnetic transitions. The servo system generally uses servo information recorded on the disk surface. The servo information is interspersed among the data information also recorded on the disk. The SERVO GATE signal indicates when the head is reading servo information. At such times, the switch 104 is opened by the logic circuit 106 to remove the noise so that the read channel can process the servo information being read by the head.

As is well known, an integrated circuit such as would implement the read/write control 36, typically includes an addressable register set to store control and status information relevant to the operation of the circuit. A conventional communication port circuit would be included in the read/write control 36 to support communication via the coupling between the microprocessor 35 and the read/write control 36, such that the microprocessor 35 can address and then read or write preselected registers within the read/write control 36 to control the transfer of data and information between these components.

According to the present invention, one of the registers 108 available on the integrated circuit implementing the read/write control 36 is used to store a noise level value. The microprocessor 35 can use the communication port to address and write a noise level value into the register 108. The output of the noise level register is coupled to a gain control of the amplifier 100 to set the gain, and thereby the level of noise output by the amplifier 100. During a calibration of the read channel, the microprocessor 35 is programmed to write a noise level into the register 108 and to control the logic circuit 106 to close the switch 104 such that noise of a preselected level is introduced into the read channel. The operation of the read channel is thus modified by selecting a suitable level of noise to approach marginal performance for a high error rate. The channel can then be calibrated to a minimum error rate while operating with the introduced noise. After calibration, the microprocessor 35 controls the logic circuit 106 to open the switch 104 and remove the noise. The read channel will continue to operate at the minimum error rate set by the calibration.

I claim:

1. For use in a storage device including a storage medium for storing data, a head for reading information from and writing information on the storage medium and a processor for performing control functions in the storage device, a read channel, which comprises:

a set of electronic components for receiving and processing information read by the head from the storage medium;

each component of the set of electronic components having an output and being coupled in a predetermined arrangement to other components of the set of electronic components to process the read information; and a noise generator electrically coupled to the set of electronic components;

the noise generator being selectively operated to introduce electrical noise during a calibration procedure into the set of electronic components to cause the set of electronic components to operate at a marginal level of performance during the calibration-procedure.

2. The read channel of claim 1 wherein the noise generator is a Gaussian noise generator.

3. The read channel of claim 1 wherein the noise generator is adjustable to vary the amount of noise introduced into the set of electronic components.

4. The read channel of claim 3 wherein the noise generator is coupled to the processor and the processor operates to adjust the amount of noise introduced by the noise generator into the set of electronic components.

5. The read channel of claim 3 further comprising an addressable register coupled to the adjustable noise generator and arranged to store a value to select a noise level for output by the noise generator.

6. The read channel of claim 5 wherein the addressable register is adaptable to be addressed and written by the processor.

7. The read channel of claim 1 wherein the set of electronic components includes an automatic gain control amplifier, the noise generator being coupled to the automatic gain control amplifier for introduction of noise.

8. The read channel of claim 1 wherein the set of electronic components comprises a PRML channel.

9. A disk drive including a storage medium having data tracks for storing data, a spindle motor mounting the storage medium for rotation, a head for reading information from and writing information on the data tracks of the storage medium and a processor for performing control functions in the disk drive, and a PRML read channel, characterized by:

a noise generator coupled to the PRML read channel and selectively operated to introduce electrical noise having a mean value of zero into the PRML read channel to cause the PRML read channel to operate at a marginal level of performance during a calibration procedure.

10. The disk drive of claim 9 wherein the noise generator is a Gaussian noise generator.

11. The disk drive of claim 9 wherein the noise generator is adjustable to vary the amount of noise introduced into the PRML read channel.

12. The disk drive of claim 11 wherein the noise generator is coupled to the processor and the processor operates to adjust the amount of noise introduced by the noise generator into the PRML read channel.

13. The disk drive of claim 11 wherein the noise generator is coupled to the processor and the processor operates to adjust the amount of noise introduced by the noise generator into the PRML read channel.

14. The disk drive of claim 11 further comprising an addressable register coupled to the noise generator and arranged to store a value to select a noise level for output by the noise generator.

15. The disk drive of claim 14 wherein the addressable register is adaptable to be addressed and written by the processor.

16. A disk drive, which comprises:

a processor for controlling the disk drive;

a storage medium having data tracks for storing data;

a spindle motor mounting the storage medium for rotation;

a head for reading information from and writing information on the data tracks of the storage medium;

a PRML read channel for receiving and processing information read by the head from the data tracks; and a noise generator coupled to the PRML read channel and selectively operated by the processor to introduce electrical noise into the PRML read channel to cause the PRML read channel to operate at a marginal level of performance during a calibration procedure.

17. The disk drive of claim 16 wherein the noise generator is a Gaussian noise generator.

18. The disk drive of claim 16, wherein the noise generator is adjustable to vary the amount of noise introduced into the PRML read channel.

19. The disk drive of claim 18 wherein the noise generator is coupled to the processor and the processor operates to adjust the amount of noise introduced by the noise generator into the PRML read Channel.

20. The disk drive of claim 18 further comprising an addressable register coupled to the noise generator and arranged to store a value to select a noise level for output by the noise generator.

21. The disk drive of claim 20 wherein the addressable register,is addressed and written by the processor.

22. The disk drive of claim 16 wherein the PRML read channel includes an automatic gain control amplifier, the noise generator being coupled to the automatic gain control amplifier for introduction of noise.

23. The disk drive of claim 16 wherein the noise generator introduces electrical noise having a mean value of zero into the PRML read channel.

* * * * *

UNITED STATES PATENT AND TRADEMARK OFFICE
CERTIFICATE OF CORRECTION

PATENT NO. : 5,585,974
DATED : DECEMBER 17, 1996
INVENTOR(S) : LOUIS J. SHRINKLE

It is certified that error appears in the above-indentified patent and that said Letters Patent is hereby corrected as shown below:

Col. 4, line 15, delete "$10^4$", insert --$10^{-4}$--

Col. 6, line 49, delete "derive-digital", insert --derive digital--

Col. 10, line 39, delete the comma after "register"

Signed and Sealed this

Twenty-fifth Day of March, 1997

Attest:

BRUCE LEHMAN

Attesting Officer

Commissioner of Patents and Trademarks